Dec. 11, 1951 S. DOBA, JR 2,578,341

STABILIZED FEEDBACK AMPLIFIER

Filed Jan. 26, 1949 2 SHEETS—SHEET 1

INVENTOR
S. DOBA, JR.
BY
B. C. Eager
ATTORNEY

Dec. 11, 1951 S. DOBA, JR 2,578,341

STABILIZED FEEDBACK AMPLIFIER

Filed Jan. 26, 1949 2 SHEETS—SHEET 2

INVENTOR
S. DOBA, JR.
BY
B. G. Eeger
ATTORNEY

Patented Dec. 11, 1951

2,578,341

UNITED STATES PATENT OFFICE 2,578,341

STABILIZED FEEDBACK AMPLIFIER

Stephen Doba, Jr., Whippany, N. J., assignor to Bell Telephone Laboratories, Incorporated, New York, N. Y., a corporation of New York Application January 26, 1949, Serial No. 72,928

3 Claims. (Cl. 179—171)

This invention relates to wide band stabilized feedback amplifiers, and aims to improve amplification stability of such amplifiers.

One of the problems encountered in the design and construction of wide band feedback amplifiers such as are used for television is the difficulty of achieving a high order of gain stability. This difficulty is occasioned by the limited amount of feedback which may be obtained over the wide bands employed.

One of the principal benefits to be derived from the use of feedback as described in an article by H. S. Black on stabilized feedback amplifiers, Bell System Technical Journal, January 1934, and in his Patent 2,102,671, is the stabilization of the effective amplification in the presence of variations in the amplifier vacuum tubes. In general the amount of stabilization achieved is proportional to the amount of feedback.

However, as shown by H. W. Bode in his Patent 2,123,178 and his book on "Network Analysis and Feedback Amplifier Design," published by D. Van Nostrand Company in 1945, the maximum amount of feedback obtainable with any circuit configuration and with a given number of vacuum tubes is definitely limited. This limitation of feedback is more severe the wider the transmitted band width it is desired to secure. The net effect of this limitation is that for very wide band amplifiers such as are used in television it is impossible to achieve as high a degree of stability of amplification as is possible for narrow band amplifiers.

In the above-mentioned article and patent of H. S. Black it is pointed out that it is possible to achieve perfect stability of amplification, without infinite feedback, by so apportioning the feedback loop amplification and phase shift as to satisfy the relationship $$1+|\mu\beta|\cos\varphi=0 \qquad (1)$$

In one aspect the present invention is an amplifier in which, as explained hereinafter, this relationship is achieved over a wide band of frequencies while at the same time proper account of the inherent limitations in maximum feedback is taken, as indicated in the above-mentioned work of H. W. Bode. A resultant improvement in amplification stability is thus attained.

Figure 1:
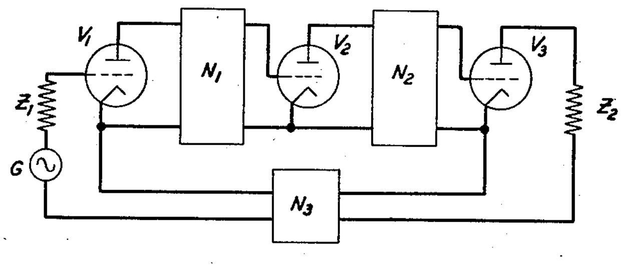
Figure 2:
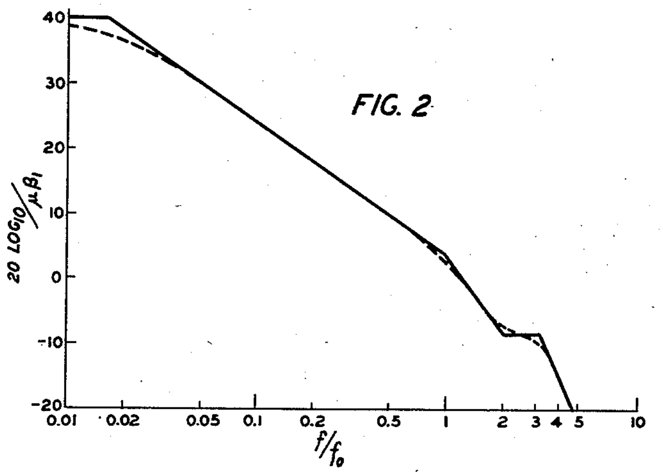
Figure 3:
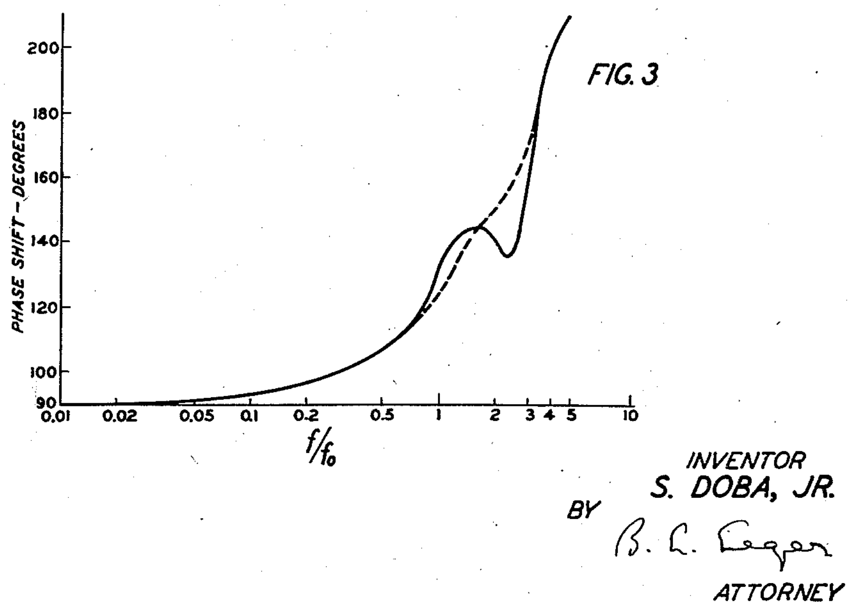
Figure 4:
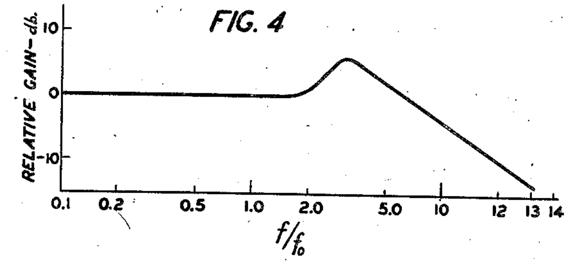
Figure 5:
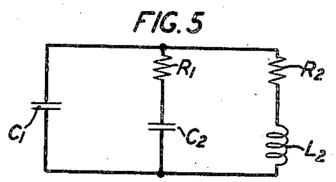
Figure 7:
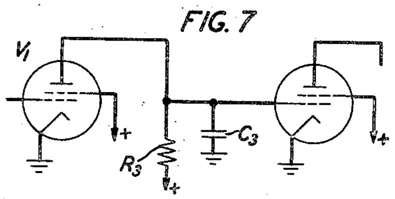
Figure 6:
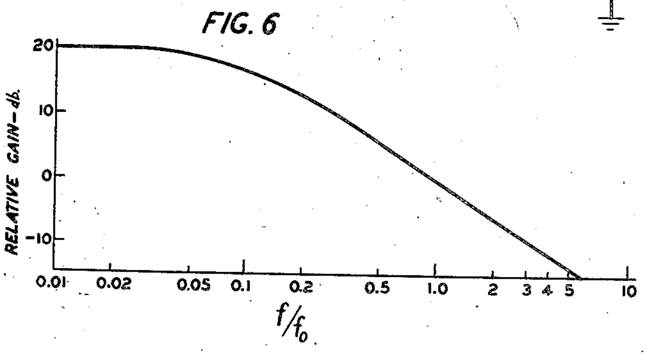
Figure 9:
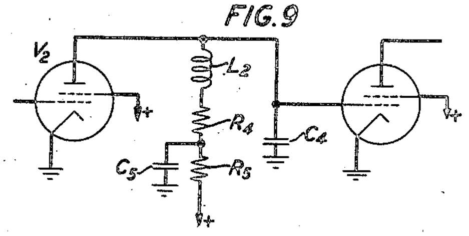
Figure 8:
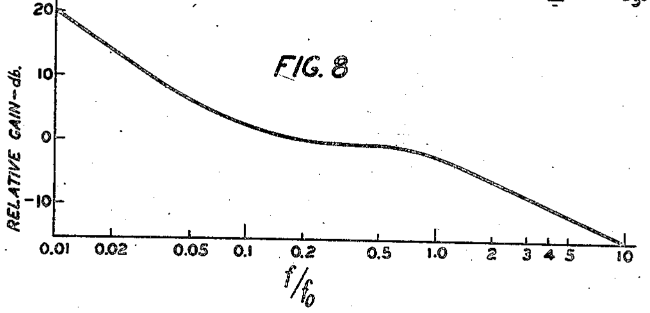

Fig. 1 shows a feedback amplifier wherein, in accordance with the invention, the networks $N_3$, $N_2$ and $N_1$ may be for example, as indicated in Figs. 5, 7 and 9, respectively;

Figs. 4, 6 and 8 show response of the networks of Figs. 5, 7 and 9, respectively; and Figs. 2 and 3 show the loop gain and loop phase shift, respectively, of the amplifier with the networks of Figs. 5, 7 and 9.

The principles of the present invention may be understood by considering a simplified feedback amplifier as shown in Fig. 1. In order to understand the principles more readily, it is well to consider the case (not fully realizable in practice) when network $N_1$ consists only of a shunt condenser. Network $N_2$ consists of a condenser shunted by the mid-shunt termination of a constant K low-pass filter, the characteristics of which are well known to the art.

Network $N_3$ is to consist of only a shunt resistance. All other effects such as those due to parasitic capacitances existing across any part of the circuits, transit time of electrons through the vacuum tubes, plate-to-cathode impedances of the vacuum tubes, etc., are temporarily to be neglected.

The amplification of vacuum tube $V_1$ working into network $N_1$ is then given by:

$$\mu_1=\frac{g_1}{\omega c_1} \qquad (2)$$

where $\mu_1$ is the absolute magnitude of the amplification, $g_1$ is the transconductance of vacuum tube $V_1$, $c_1$ is the capacitance of network $N_1$ and $\omega$ is $2\pi$ times the frequency of the impressed signal.

The associated phase shift concurring with this amplification is $$\frac{\pi}{2} \text{ radians or 90 degrees}$$

The amplification of vacuum tube $V_2$ working into network $N_2$, for frequencies less than the cut-off frequency of the low-pass filter associated in $N_2$ is given by:

$$\mu_2=g_2R \qquad (3)$$

where $\mu_2$ is the absolute magnitude of the amplification, $g_2$ is the transconductance of vacuum tube $V_2$, and R is the nominal impedance of the low-pass filter. The associated phase shift of this stage is given by:

$$\varphi_2=\sin^{-1}\frac{f}{f_0} \qquad (4)$$

where $\varphi_2$ is the phase shift in radians, $f_0$ is the cut-off frequency of the low-pass filter, and $f$ is the frequency of the impressed signal.

The amplification of vacuum tube $V_3$ working into network $N_3$ is given by:

$$\mu_3=g_3r \qquad (5)$$

where $\mu_3$ is the absolute magnitude of the amplification, $g_3$ is the transconductance of vacuum tube $V_3$, and $r$ is the resistance of network $N_3$. The phase shift of this stage is assumed to be zero.

The total amplification of the loop circuit, designated by $|\mu\beta|$ is then given by the products of the amplifications of the parts and is $$|\mu\beta|=\frac{g_1 g_2 g_3 r R}{\omega c_1} \qquad (6)$$

The phase shift, designated $\varphi$, encountered around the loop is then similarly given by the sum of the individual phase shifts, with due care given to the normal phase reversal encountered in going through a vacuum tube, and is given by:

$$\varphi=\frac{\pi}{2}+\sin^{-1}\frac{f}{f_0} \qquad (7)$$

where $\varphi$ is expressed in radians.

If, in Equation 6, the various quantities $g_1$, $g_2$, $g_3$, $r$, $R$, $c_1$, are so apportioned that at the frequency $f_0$, $|\mu\beta|=1$, then Equation 6 may be re-expressed as:

$$|\mu\beta|=\frac{f}{f_0} \qquad (8)$$

Finally, from Equations 7 and 8, we have as the resulting equation:

$$|\mu\beta| \cos \varphi=-1 \qquad (9)$$

As shown by H. S. Black, the fulfillment of the condition expressed by Equation 9 means that for small changes in the magnitude of $|\mu|$ the external amplification of the amplifier is constant, independent of these changes.

Due to the simplifying assumptions made, the above analysis does not hold in practice since the inherent parasitic capacitances of the various parts of the circuits cannot be neglected. Furthermore, even as shown the amplifier would oscillate or sing, since at the frequency $f_0$, $|\mu\beta|=1$ and $\varphi=\pi$. These limitations can be removed by applying the methods developed by Bode. For instance, if it is desired to have a phase margin, against singing, of $\pi y$ radians, then the total phase shift due to networks $N_1$, $N_2$, $N_3$ and all associated parasitic effects can be made to be:

$$\varphi=\frac{\pi}{2}+(1-2y)\sin^{-1}\frac{f}{f_0} \qquad (10)$$

where $y$ is a number not greater than ½.

With this value of phase shift, the value of $|\mu\beta|$ necessary to make $|\mu\beta|\cos\varphi$ equal $-1$, in order to achieve the purpose of this invention, should be:

$$|\mu\beta|=\frac{1}{1-2y}\frac{f_0}{f} \qquad (11)$$

Equations 10 and 11 may be combined in the single expression:

$$\mu\beta=\frac{\left[\sqrt{1-\frac{f^2}{f_0^2}}-j\frac{f}{f_0}\right]^{(1-2y)}}{j\frac{f}{f_0}(1-2y)} \qquad (11A)$$

wherein $\mu\beta$ denotes the complex loop transmission ratio.

Corresponding to Equation 9 we now have the expression:

$$|\mu\beta|\cos\varphi=\frac{-f_0}{f}\,\frac{\sin\left[(1-2y)\sin^{-1}\frac{f}{f_0}\right]}{[1-2y]} \qquad (12)$$

In Equation 12 it may be seen that the expression $-|\mu\beta|\cos\varphi$ is not equal to unity except at frequencies much lower than $f_0$. In order to determine the maximum value of the ratio $$\frac{f}{f_0}$$

which in practice would still approximate the required expression $-|\mu\beta|\cos\varphi=1$ adequately, the following analysis may be used. Since $\beta$ is assumed to be constant we need consider only the functions:

$$|\mu'\beta|^2=\left|\frac{\mu\beta}{1+\mu\beta}\right| \qquad (13)$$

and $$\frac{1}{|\mu'\beta|^2}=1+\frac{1+2|\mu\beta|\cos\varphi}{|\mu\beta|^2} \qquad (14)$$

where $\mu'$ is the external amplification.

Now, in accordance with Equation 11 let the value of $|\mu\beta|$ be $$\frac{m}{1-2y}\frac{f_0}{f}$$

where $m$ is a measure of the variations in $|\mu|$ and has normally a value of unity. Equation 14 may then be written as:

$$\frac{1}{|\mu'\beta|^2}=$$

$$1+\frac{(1-2y)^2}{m^2}\frac{f^2}{f_0^2}\left[1-\frac{2m\sin\left[(1-2y)\sin^{-1}\frac{f}{f_0}\right]}{(1-2y)\frac{f}{f_0}}\right]=$$

$$1+(1-2y)^2\frac{f^2}{f_0^2}\left(\frac{1-2m}{m^2}\right)+\frac{(1-2y)^2}{3m}\left(\frac{f}{f_0}\right)^4[1-(1-2y)^2]$$

$$+\text{ higher order terms} \qquad (15)$$

Examining Equation 15 we may conclude that for values of $f/f_0$ less than unity, the variations in $|\mu'|$ are given by essentially the second term. For values of $f/f_0 < ¼$, the third term for instance will normally have an effect considerably less than .01 decibel. Therefore we conclude that the theoretical relationship $-|\mu\beta|\cos\varphi=1$ is sufficiently satisfied in practice for the frequency range $f/f_0 < ¼$. Hence we may write, approximately:

$$\frac{1}{|\mu'\beta|^2}=1+(1-2y)^2\frac{f^2}{f_0^2}\left(\frac{1-2m}{m^2}\right) \qquad (16)$$

from which we may obtain the variations in $|\mu'|$ due to variations in $m$ as approximately:

$$\frac{\delta|\mu'|}{|\mu'|}\doteq\frac{(1-2y)^2\frac{f^2}{f_0^2}\left(\frac{1-m}{m^2}\right)^{\delta m}}{1+(1-2y^2)\frac{f^2}{f_0^2}\left(\frac{1-2m}{2m}\right)} \qquad (17)$$

From Equation 17 it may be seen that for small variations in $m$, i. e., small variations in $|\mu|$, the percentage variation in the external gain $|\mu'|$ is zero for the normal value of $m=1$.

The above discussion relates to the broad, general, theoretical design problem of a feedback amplifier. In practicing the invention, certain modifications are not only desirable, but necessary. One such limitation imposed in practice relates to Equation 11 in which the value of $|\mu\beta|$ tends to infinitely large values as the frequency $f$ approaches zero, or direct current. It is therefore necessary to modify the actual value of $|\mu\beta|$ so that it has a limiting upper value. If this is done at a sufficiently low frequency and for sufficiently large values of $|\mu\beta|$, the practical result is that even though the relationship $|\mu\beta|\cos\varphi=-1$ is not satisfied, the value of $|\mu\beta|$ is so large that stability of external gain is achieved thereby nevertheless. Another desirable modification is the replacement of the characteristic exemplified by the network $N_2$ in Fig. 1, i. e., the mid-shunt impedance of a constant K low-pass filter, so that the desired results may be achieved with simpler approximations as indicated below.

As an illustration of the practice of the principles involved we may consider the design of a three-stage amplifier in which it is desired to have a gain margin of 8 decibels and a phase margin of about 45 degrees against singing. These requirements would be met by the solid curves of Figs. 2 and 3.

These particular curves were chosen because of the ease with which they may be approximated in practice. For instance the dotted lines in Figs. 2 and 3 show the approximate values which may be obtained with the circuits to be described below.

The specific character of the $|\mu\beta|$ curve of Fig. 2 is dictated by the physical behavior of the circuits as well as the discussion that has gone before. Since this is a three-stage amplifier, the feedback gain at sufficiently high frequencies (i. e. when $$\frac{f}{f_0}$$

is greater than 3), must decrease at the rate of 18 decibels per octave. In accordance with the principles stated by Bode the undesirable phase shift accompanying this rapid rate of cut-off may be compensated for at lower frequencies by the horizontal gain step extending from $$\frac{f}{f_0}=2 \text{ to } \frac{f}{f_0}=3$$

The height of this step at −8 decibels is the required gain margin.

Again in accordance with Bode, it may be shown that the phase shift for frequencies below $$\frac{f}{f_0}=1$$

is given approximately by:

$$\varphi=\frac{\pi}{2}+\frac{2}{\pi}\frac{f}{f_0}+\frac{2}{9\pi}\frac{f^3}{f_0^3}+\frac{2}{25\pi}\frac{f^5}{f_0^5}+\cdots \qquad (18)$$

From Equation 18 it may be readily seen that for values of $$\frac{f}{f_0}\leq\frac{1}{4}$$

an exceedingly close approximation to the phase is given by only the first two terms. Hence for this frequency range, in order to satisfy the infinite stability condition we must have:

$$|\mu\beta|=-\frac{1}{\cos\varphi}\doteq\frac{\pi}{2}\frac{f_0}{f} \qquad (19)$$

This determines the loop gain characteristic in Fig. 2 such that at $$\frac{f}{f_0}=1, 20\log_{10}|\mu\beta|=20\log_{10}\left(\frac{\pi}{2}\right)\doteq 4 \text{ decibels}$$

The maximum feedback, at extremely low frequencies has been shown limited to 40 decibels for illustrative purposes. It may be made considerably in excess of this as will be shown below.

Since this is a three-stage amplifier under consideration, we are at liberty to apportion the gain characteristic of Fig. 2 in an infinite variety of ways among the three interstage or coupling circuits. For illustrative purposes this apportionment will be done in only one way with particular emphasis upon the method of obtaining large amounts of gain at low frequencies.

As a starting point, it will be assumed that the amplifier is to have a uniform external gain characteristic. This requires $|\mu\beta|$ to be constant within the band, and accordingly we may assign to $\beta$ only the shaping required at the upper end of the band as shown in Fig. 4.

Because the $\beta$ circuit actually used will depend upon the particular amplifier used, e. g., shunt, series, or cathode type feedback, it is not possible to specify the network configuration required to produce the characteristic of Fig. 4. (Cathode type feedback is shown in Fig. 3.12B on page 40 of the Bode book referred to above, for example.) By way of example, a possible configuration is shown in Fig. 5 suitable in a cathode feedback amplifier. In Fig. 5, $C_1$ represents the parasitic, or limiting capacitance, which must be associated with the $\beta$ circuit.

The next step in the apportionment of the total characteristic is shown in Fig. 6, with the interstage, or coupling elements required, shown in Fig. 7. In Fig. 7, $C_3$ is the parasitic capacitance necessarily existing at that point. The value of $R_3$ is not critical, but is generally limited in its maximum value by the amount of plate battery available. Too high a value of $R_3$ reduces the plate potential of $V_1$ below the value required for normal operation.

The point to be stressed in the design is that $R_3$ is made as high as possible, and that the resulting characteristic of Fig. 6 is then determined from this value of $R_3$ and the value of $C_3$.

The remainder of the over-all characteristic required is then supplied by the remaining interstage, and has the shape shown in Fig. 8. There are two frequency regions of interest in Fig. 8. The first is in the neighborhood of $f=f_0$. In the interstage network of Fig. 9, this part of the characteristic is determined by the elements $R_4$, $C_4$ and $L_2$. The values of these elements in order to approximate the relationship shown by Equation 18 are determined by the relationships:

$$R_4C_4=\frac{1}{2\pi f_0}$$

and $$L_2=(\sqrt{2}-1)R_4^2C_4 \qquad (20)$$

Here again, $C_4$ is the parasitic capacitance associated with the interstage circuit.

Those versed in the art will recognize that the network comprised of elements $R_4$, $C_4$ and $L_2$ with the value of $L_2$ as indicated by Equation 20 constitutes an approximation to the filter structure indicated by $N_2$ of Fig. 1 and complying substantially with the phase requirements of Equation 18. It will also be appreciated by those versed in the art that the network considered here is not the only one which may be used. In certain applications for instance, the degree of approximation required may necessitate the use of more complex structures, while on the other hand for other applications an even simpler configuration, such as may be attained by the deletion of $L_2$, may be adequate.

The second frequency region of interest is that shown in Fig. 8 for values of $$\frac{f}{f_0} \text{ near } 0.1$$

In this region the characteristic is determined almost entirely by the values of $R_4$, $R_5$ and $C_5$.

The values of these elements are determined by the relationship:

$$\frac{C_5 R_4 R_5}{R_4+R_5}=R_3 C_3 \quad (21)$$

where $R_3$ and $C_3$ are the values obtaining in the interstage of Fig. 7. In general, it may be noted that the same restrictions on the maximum value of $R_5$ hold as for the maximum value of $R_3$. It is to be noted, however, that the problem of obtaining a high value of loop-gain at low frequencies is divided between the two interstages with the result that considerably higher values of gain may be achieved than if the low frequency $$\left(\frac{f}{f_0}<1\right)$$

shaping of Fig. 2 had been achieved in only one interstage.

In the preceding illustrative example no consideration has been given to the behavior of the amplifier at direct current, the assumption being implicit that direct coupling was used throughout. In the case where direct coupling is not desired, the design problem of providing a cut-off characteristic without producing oscillations may be handled in the usual manner and need not be considered here.

In some applications it may be desired to have the amplifier operate more like a band-pass structure. In such a case the previous design considerations still apply provided that the appropriate frequency transformation is made. As is well known, this is equivalent to replacing the frequency variable, $$\frac{f}{f_0}$$

in Fig. 2 for instance, by the new frequency variable $$\frac{f}{f_0}\left(1-\frac{f_c^2}{f^2}\right)$$

where $f_0$ has the same meaning as before and $f_c$ is the center frequency.

In its application to video repeaters, for example, the invention yields the following advantages:

1. Increased feedback at low frequencies. This is desirable because of the characteristic of the television signal that above the line frequency the amplitudes of the signal components fall off inversely with frequency, so that the amount of feedback required for the reduction of distortion at the upper edge of the band is considerably less than at the lower edge. The feedback may fall off at the rate of 6 decibels per octave.

2. Variation in the external gain characteristic due to variation in $\mu$ is greatly reduced, because of the substantial equality of $|\mu\beta|$ and $-\sec\varphi$.

It is to be understood that the above-described arrangements are illustrative of the application of the principles of the invention. Numerous other arrangements may be devised by those skilled in the art without departing from the spirit and scope of the invention.

What is claimed is:

1. A wave amplifying system comprising an amplifier, a feedback path extending between the output and input circuits of said amplifier and forming therewith a closed loop circuit, and frequency selective impedance networks included in said loop circuit, said networks being proportioned to provide in combination with the gain of the amplifier a varying loop gain substantially in accordance with the relationship $$\mu\beta=\frac{\left[\sqrt{1-\frac{f^2}{f_0^2}}-j\frac{f}{f_0}\right]^{(1-2y)}}{\left[j\frac{f}{f_0}\right]^{(1-2y)}}$$

in which $\mu\beta$ denotes the complex loop transmission ratio, $y$ is a number not greater than ½, $f$ is the frequency of the wave to be amplified and $f_0$ is a given frequency such that $f<f_0$.

2. A wave amplifying system comprising an amplifier, a feedback path extending between the output and input circuits of said amplifier and forming therewith a closed loop circuit, and frequency selective impedance networks included in said loop circuit, said networks being proportioned to provide in combination with the gain of the amplifier a varying loop gain substantially in accordance with the relationship $$\mu\beta=\frac{\left[\sqrt{1-\frac{f^2}{f_0^2}}-j\frac{f}{f_0}\right]^{(1-2y)}}{\left[j\frac{f}{f_0}\right]^{(1-2y)}}$$

in which the absolute magnitude and the phase angle of the loop transmission ratio vary in the frequency region $f<f_0$ substantially in accordance with the relationship $$|\mu\beta|\cos\varphi=-1$$

$|\mu\beta|$ denoting the absolute magnitude and $\varphi$ the phase angle of the loop transmission ratio, $y$ denoting a number not greater than ½, $f$ denoting the frequency of the wave to be amplified and $f_0$ denoting a given frequency such that $f<f_0$.

3. An amplifier comprising three electric space discharge devices interconnected by two interstage circuits, a negative feedback circuit connected from the output to the input of the amplifier, one of said interstage circuits having the magnitude of its transmission substantially uniform below a given frequency $f_1$ and decreasing substantially 6 decibels per octave of frequency increase above $f_1$, and the other of said interstage circuits having the magnitude of its transmission substantially uniform below a frequency $f_2$ lower than $f_1$, and decreasing substantially 6 decibels per octave of frequency increase from $f_2$ to $f_1$, uniform from $f_1$ to a frequency $f_3$ higher than $f_1$, and decreasing substantially 6 decibels per octave of frequency increase above $f_3$.

STEPHEN DOBA, Jr.

REFERENCES CITED

The following references are of record in the file of this patent:

UNITED STATES PATENTS

| Number | Name | Date |
|---|---|---|
| 2,102,671 | Black | Dec. 21, 1937 |
| 2,123,178 | Bode | July 12, 1938 |